March 21, 1967 G. H. LOOSE 3,310,431
METHOD AND APPARATUS FOR COATING ELECTRICAL COMPONENTS
Filed Dec. 21, 1962
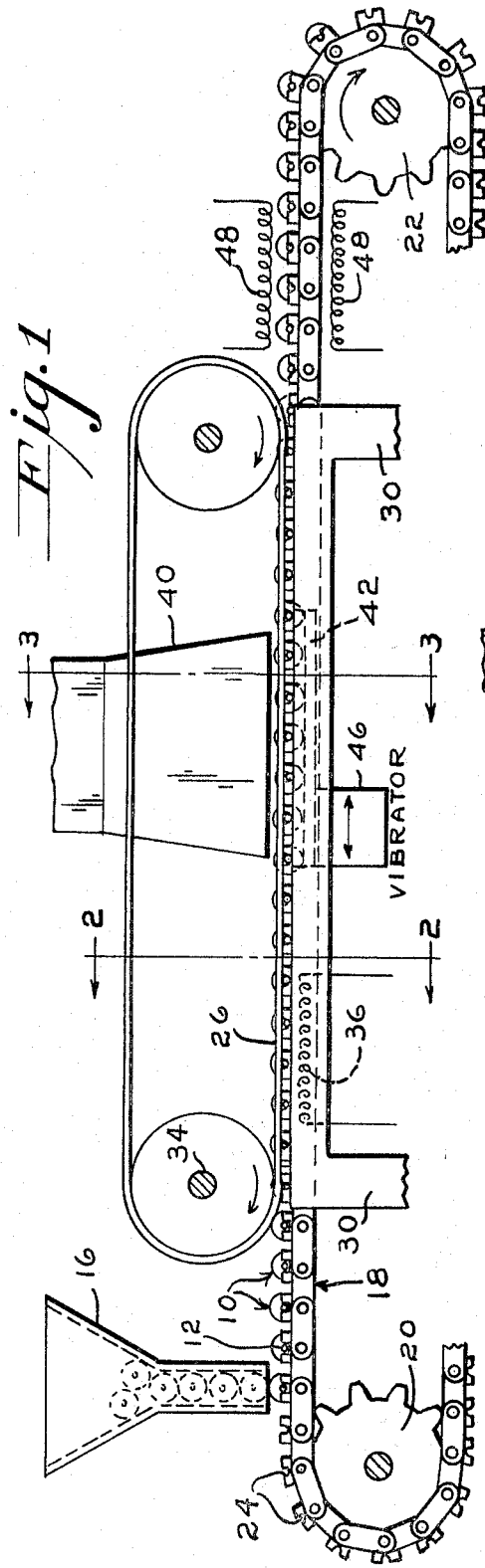
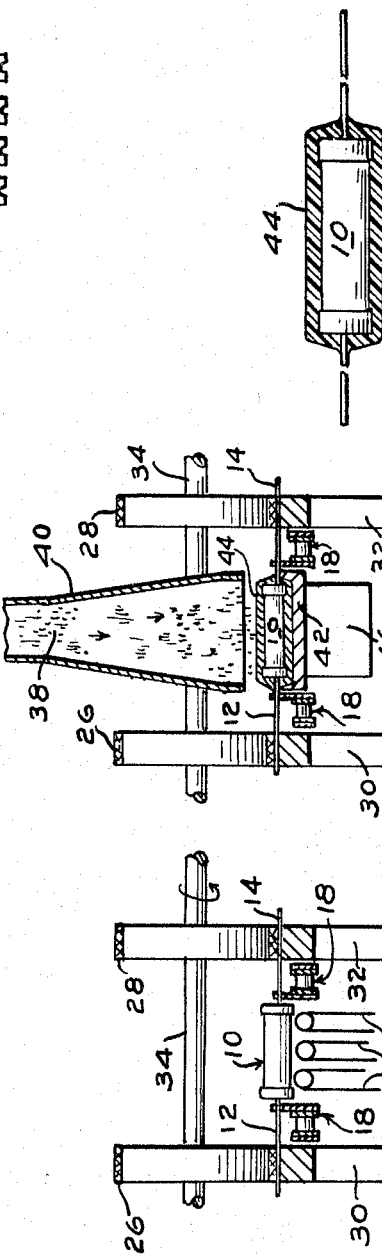
INVENTOR.
GUENTER H. LOOSE
BY Clarence R. Patty Jr.
ATTORNEY

United States Patent Office 3,310,431
Patented Mar. 21, 1967

3,310,431
METHOD AND APPARATUS FOR COATING ELECTRICAL COMPONENTS
Guenter H. Loose, Bradford, Pa., assignor to Corning Glass Works, Corning, N.Y., a corporation of New York
Filed Dec. 21, 1962, Ser. No. 246,390
9 Claims. (Cl. 117—201)

This invention relates to electrical components, and more particularly to a method and apparatus for coating substantially cylindrical electrical components, but is in no way limited to such applications.

It is an object of this invention to provide an improved method and apparatus for coating substantially cylindrical electrical components uniformly and inexpensively.

It is another object of this invention to provide a method and apparatus for readily applying a dense, moisture impervious coating to an electrical component.

A still further object is to provide an inexpensive, moisture impervious, coated electrical component.

The objects of this invention may be achieved by providing a synthetic resinous material in the form of pulverulent granules, causing a substantially cylindrical electrical component having leads along its longitudinal axis to be conveyed along a predetermined path transverse to its length, causing said component to spin about its longitudinal axis, heating said component to a temperature at least as high as the coalescing temperature of said resinous material, applying said resinous material to the heated surface of said component causing said granules to coalesce, conveying said component along a preshaped channel while applying said resinous material and while spinning said component, thereby compacting said coalesced resinous material and forming the exterior coated shape of said component, and thereafter curing said resinous material.

Additional objects, features and advantages of the present invention will become apparent to those skilled in the art, from the following detailed description and the attached drawings, on which, by way of example, only the preferred embodiments of the invention are illustrated.

FIG. 1 is a front elevational view of the apparatus for coating an electrical component illustrating the present invention.

FIG. 2 is a cross sectional view taken along 2—2 of FIG. 1.

FIG. 3 is a cross sectional view taken along 3—3 of FIG. 1.

FIG. 4 is a cross sectional elevation of an electrical component of this invention.

The coating process of this invention is carried out by first heating an electrical component and then applying uniformly thereto a synthetic resinous material in the form of pulverulent granules. The heat from the component melts the resin granules coming in contact with its exposed surface, causing the surface to become continuously coated with hot pliable resin. The exterior surface of the component so coated is then suitably shaped and compacted while the resin is pliable. Thereafter, the coating is cured if required.

FIG. 1 illustrates an apparatus suitable for carrying out the coating process of this invention. Substantially cylindrical, uncoated electrical components 10 having leads 12 and 14 fixed thereto along the longitudinal axis of said components are loaded, by means of a loading apparatus 16, on a conveyor assembly comprising a power source, not shown, conveyor chain 18 and chain drive wheels 20 and 22. Conveyor chain 18 is provided with suitable means such as grooves 24 for holding electrical components 10 while they are being conveyed along a path transverse to their length.

Electrical components 10 are caused to spin about their longitudinal axis by means of moving belts 26 and 28. As components 10 are conveyed by chain 18, leads 12 are gripped between belt 26 and the upper surface of support 30 and leads 14 are gripped between belt 28 and the upper surface of support 32. The upper surfaces of supports 30 and 32 may also be moving belts. Components 10 are caused to spin as moving belts 26 and 28 rotate leads 12 and 14 along supports 30 and 32. Said belts 26 and 28 may move in a direction opposite to the travel of chain 18, or in the same direction but at a velocity different from that of chain 18. Belts 26 and 28 are driven at a common velocity by suitable means, not shown, through shaft 34.

Referring to FIGS. 1 and 2 it is seen that after components 10 are caused to spin about their longitudinal axis, they are heated by heaters 36 to a temperature at least as high as the melting temperature of the coating material to be applied. Spinning said components while they are being heated permits uniform heating.

After being heated, components 10 are conveyed by chain 18 to the coating position. Referring to FIGS. 1 and 3, powdered synthetic resinous material 38 is caused to be applied to components 10 by sprinkling said material thereon by means of powder feeding apparatus 40. Simultaneously with spinning said heated components and applying powdered synthetic resin thereto, the components are conveyed by chain 18 along an open channel 42. Apparatus 40 feeds powdered synthetic resinous material, from a source not shown, and distributes it over the span of channel 42 so that a uniform buildup of coating material on the components is accomplished. The surface of channel 42 along which components 10 are conveyed is suitably shaped to impart the desired external shape to coated electrical component 44. As the powdered synthetic resinous mtterial is sprinkled on the heated electrical component 10, it coalesces on the surface allowing more powder to adhere thereto and coalesce. As the component is spun within open channel 42, the coalesced material is compacted to form a dense coating and the exterior shape of the component is conformed to that of the channel surface. To remove the excess powdered material from the channel, vibrator 46 is provided in conjunction with channel 42. Vibrator 46 sets up vibrations in the direction parallel to chain 18 travel causing the excess powder to fall off the end of channel 42.

After applying a coating of resinous material to components 10 the coating is cured by means of heaters 48, if required. Heaters 48 may also be used to partially cure the coating. The components having a partially cured coating can thereafter be placed into a separate furnace or the like for total curing. FIG. 4 illustrates a coated electrical component 44.

The selection of a proper resin is based on the mechanical strength required, environment, adhesion to the component, cost, as well as many other factors. Some examples of suitable resins are: epoxies, polyesters, diallyl phthalates, furans, phenol formaldehydes, melamine formaldehydes, ureas, and the like. The coating resin may be used alone or in combination with some fillers and/or other resins. Where required, the resin should contain a suitable catalyst or other setting agent. The particle size may vary with the shape and size of the component to be coated, the type of resin used and the temperature of the component. Generally, the best results are obtained with particles of 120 mesh size or less, although this invention is in no way limited to these particle sizes.

The temperature to which the components are raised is based on the type of component, the resin used, the thickness of coating desired, component lead material, as well as many other factors. One familiar with the art of coating electrical components can readily determine the proper resin and component temperature for each particular application. The outer shape of the coated electrical component may also be controlled by heating the component to different temperatures along its length, thereby allowing more resin to melt and adhere to the areas of higher temperature.

A typical example of carrying out the present invention is as follows. An uncoated resistor formed of a metallic oxide film on a cylindrical glass substrate to which leads are attached along the longitudinal axis thereof in contact with each end of said film may be provided. The resistor is disposed on a conveyor of an apparatus such as illustrated in FIG. 1 for conveying along a path transverse to its length. The resistor is caused to be spun about its longitudinal axis by suitable means and while spinning is uniformly heated to a temperature of about 180° C.

A supply of powdered epoxy resin is provided, said epoxy comprising about 92% by weight of condensation products of epichlorohydrin and diphenylolpropane (bisphenol A), 4% by weight of colloidal silica having a particle size of about 0.020 micron, and 4% by weight of melamine. Said epoxy resin has a softening temperature between 85° C. and 105° C., an average epoxide equivalent weight of 950, and particles of about 120 mesh size.

In addition, an open channel having a channel cross sectional configuration corresponding to the desired surface configuration of the coated resistor, is also provided. While the resistor is heated and while it is spinning, granules of said epoxy resin are sprinkled on the heated surface which granules melt from the heat thereof and coalesce into a continuous coating. While applying the resin, the resistor is also conveyed along the open channel causing the resin to compact and take the shape of the channel. The thus coated resistor is then heated to a temperature ranging from about 180° C. to about 250° C. for about one hour to cure the resin.

It has been found that coatings so applied are dense, uniform, and moisture impervious. Although the typical example was described in terms of a resistor, other electrical components such as capacitors, impedance elements and the like may also be coated by the method of this invention.

Although the present invention has been described with respect to specific details of certain embodiments thereof, it is not intended that such details be limitations upon the scope of the invention except insofar as set forth in the following claims.

What is claimed is:
1. The method of coating an electrical component with synthetic resinous material comprising the steps of
  (a) providing a supply of synthetic resinous material in the form of pulverulent granules,
  (b) heating said component to a temperature of at least the melting temperature of said material,
  (c) spinning said component about its longitudinal axis,
  (d) applying said granules to the heated surface of said component,
    said granules melting when coming in contact with the heated surface of said component, adhering thereto, and forming a continuous coalesced coating thereon,
  (e) compacting the coalesced resinous material, and thereafter
  (f) curing said resinous material.

2. The method of claim 1 wherein the synthetic resinous material is an epoxy resin.

3. The method of coating a substantially cylindrical electrical component with a synthetic resinous material comprising the steps of
  (a) providing a supply of synthetic resinous material in the form of pulverulent granules,
  (b) heating said component to a temperature of at least the melting temperature of said material,
  (c) spinning said component about its longitudinal axis,
  (d) applying said granules to the heated surface of said component,
    said granules melting when coming in contact with the heated surface of said component, adhering thereto, and forming a continuous coalesced coating thereon,
  (e) conveying said component transverse to its longitudinal axis along an open channel while applying said material and while spinning said component, thereby compacting the coalesced resinous material and conforming the exterior shape of the coated component to the shape of said channel, and thereafter
  (f) curing said resinous material.

4. The method of claim 3 whereby the granules are applied by sprinkling.

5. The method of claim 3 wherein the synthetic resinous material is an epoxy.

6. An apparatus suitable for applying a coating of synthetic resinous material to a substantially cylindrical electrical component having leads along its longitudinal axis comprising
  (a) conveying means for moving said component along a path transverse to its longitudinal axis,
  (b) heating means disposed along said path adjacent said conveying means for heating said component to a temperature at least as high as the melting temperature of said material,
  (c) means disposed above said conveying means along said path beyond said heating means in the direction of said component is conveyed for applying said synthetic resinous material in the form of pulverulent granules to the heated component, whereby said granules melt upon coming in contact with the heated surface of said component, adhering thereto, and forming a continuous coalesced coating thereon,
  (d) compacting means disposed below and in a spaced relationship with the last-mentioned means for passage therebetween of the moving component, and
  (e) means disposed about said conveying means for engagement with said leads for spinning said component about its longitudinal axis along said compacting means during application of said synthetic resinous material, said compacting means forming the exterior shape of the coated component.

7. The apparatus of claim 6 further comprising means for curing said coating of synthetic resinous material disposed adjacent said conveying means along said path beyond said means for applying in the direction said component is conveyed.

8. The apparatus of claim 6 wherein said compacting means comprises an open channel.

9. The apparatus of claim 6 further comprising vibrating means fixedly mounted to said compacting means disposed for vibration substantially parallel to said path.

References Cited by the Examiner

UNITED STATES PATENTS

| | | | |
|---|---|---|---|
| 1,361,869 | 12/1920 | Kebler | 118—322 X |
| 1,680,260 | 8/1928 | Brogden | 118—107 |
| 3,111,642 | 11/1963 | Goodwin et al. | 117—21 X |
| 3,148,076 | 9/1964 | Snyder | 117—21 |
| 3,167,442 | 1/1965 | Brooks | 117—10 X |

FOREIGN PATENTS

| | | |
|---|---|---|
| 558,555 | 9/1932 | Germany. |
| 733,615 | 7/1955 | Great Britain. |

ALFRED L. LEAVITT, *Primary Examiner.*

WILLIAM L. JARVIS, *Examiner.*